United States Patent [19]

Solberg

[11] Patent Number: 4,930,541

[45] Date of Patent: Jun. 5, 1990

[54] VARIABLE ORIFICE DIVERTER VALVE

[75] Inventor: Mark A. Solberg, Edgewood, Md.

[73] Assignee: Morton Thiokol, Inc., Chicago, Ill.

[21] Appl. No.: 308,497

[22] Filed: Feb. 10, 1989

[51] Int. Cl.$^5$ ............................................ F16K 11/044
[52] U.S. Cl. ................................. 137/875; 137/625.44;
 251/129.07; 251/129.1; 251/129.11; 251/281
[58] Field of Search ........................... 137/625.44, 875;
 251/129.07, 129.1, 129.11, 281

[56] References Cited

U.S. PATENT DOCUMENTS

| | | | |
|---|---|---|---|
| 3,215,162 | 11/1965 | Carver | 251/129.09 X |
| 3,385,309 | 5/1968 | Bains | 137/875 X |
| 3,457,955 | 7/1969 | Kleiner et al. | 137/625.44 |
| 3,524,473 | 8/1970 | Grundmann et al. | 137/625.44 |
| 3,949,774 | 4/1976 | Morrow | 137/875 |

Primary Examiner—Gerald A. Michalsky
Attorney, Agent, or Firm—Gerald K. White

[57] ABSTRACT

The functions of a diverter valve and a variable orifice valve are combined in a single valve including an elongated magnetic member that is pivoted at a first end with a portion of the second end being positioned between opposed restrictors, a coil assembly for producing a magnetic field for selectively pulling the magnetic member toward one of the restrictors, sealing the restrictor it is pulled against thereby enabling the diversion of fluid flow, for example, from one nozzle to another, and further including a ball screw and torque motor attached to the first end of the magnetic member for selective movement thereof fore and aft, with the second end of the magnetic member being tapered and positioned in cooperative relation with respect to an orifice in a fluid inlet member whereby the fore and aft movement of the magnetic member controls the size of the orifice and the amount of fluid flow.

2 Claims, 1 Drawing Sheet

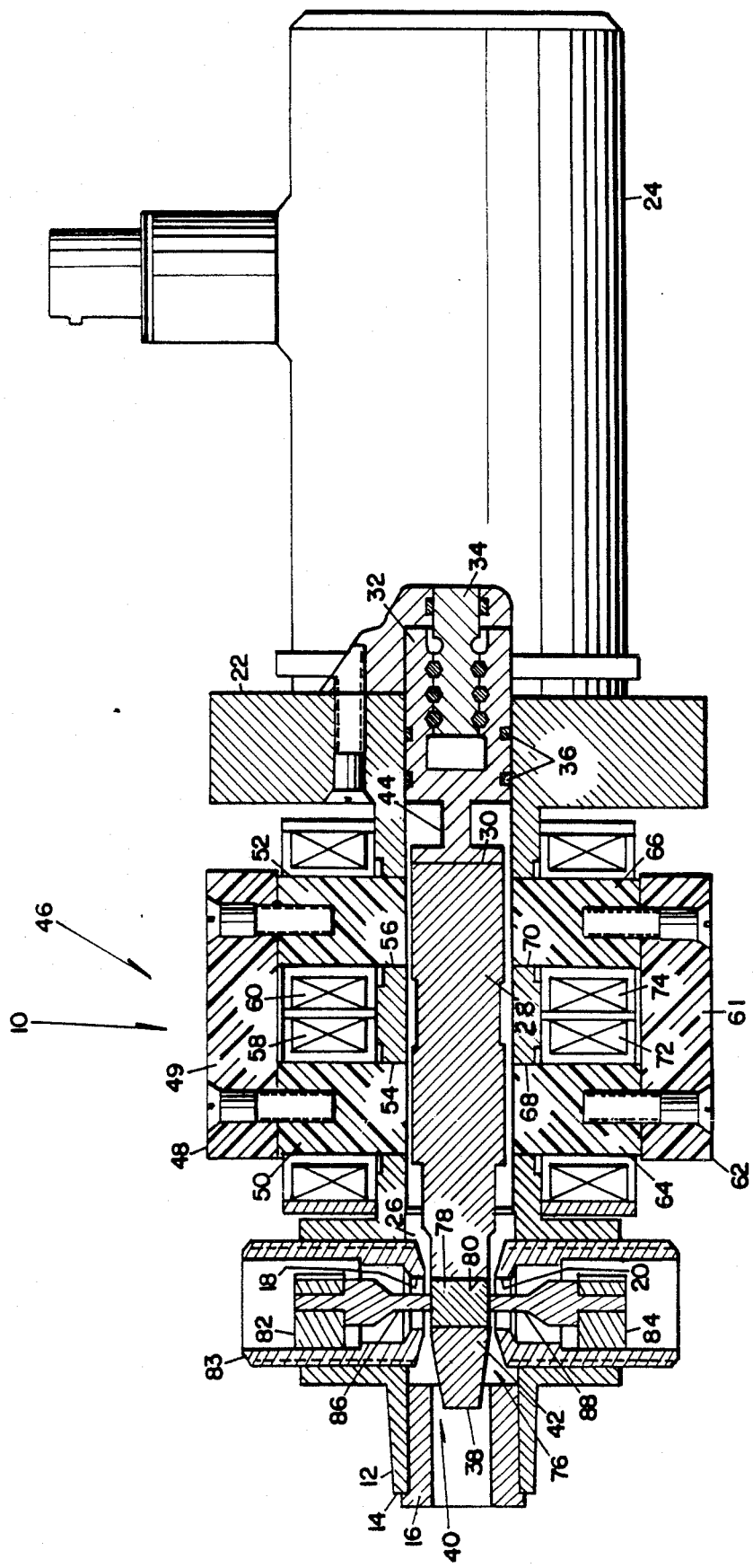

VARIABLE ORIFICE DIVERTER VALVE

BACKGROUND OF THE INVENTION

1. Field of the Invention

The present invention relates to solid propulsion systems, and more particularly, to hot gas or other fluid variable orifice valves having utility in such systems and a capability, also, for diverting gas or other fluid from one propulsion nozzle in such a system to another such nozzle.

2. Description of the Prior Art

Many types of hot gas valves having utility in the propulsion industry are known in the prior art. These valves include variable orifice, diverter, and on-off type valves. They are all characterized in being capable, alone, of performing only a single function.

In the interest of improving efficiency and reducing cost of propulsion systems, there is a need and a demand for advancing current valve technology by combining the functions of a diverter valve with a variable orifice valve into a single valve. The present invention was devised to fill the technological gap that has existed in the art in this respect.

SUMMARY OF THE INVENTION

An object of the invention is to combine into a single valve the functions of a diverter valve with a variable orifice valve.

In accomplishing this and other objectives of the invention, there is provided a variation of the flapper type diverter valve that is capable of diverting gas from one nozzle to another nozzle, for example, to provide roll control or steering of a projectile or other missle. The divert control is obtained by energizing an electromagnetic coil assembly. The electromagnetic field produced by the coil assembly pulls a flapper or elongated armature toward one or the other of two opposed restrictors, sealing the restrictor it is pulled against. There is also provided a means by which the armature can be moved fore and aft, that is, endwise, as well as from side to side. More specifically, a torque motor and a ball screw member are used to move the armature fore and aft. Additionally, one end of the armature is configured as a pintle so that the fore and aft movement of the armature alters and controls the size of an orifice. The invention thus accomplishes the functions that required two separate valves in the prior art.

The various features of novelty that characterize the invention are pointed out with particularity in the claims annexed to and forming a part of this specification. For a better understanding of the invention its operating advantages, and specific objects attained by its use, reference is made to the accompanying drawing and descriptive matter in which a preferred embodiment of the invention is illustrated.

BRIEF DESCRIPTION OF THE DRAWING

With this description of the invention, a detailed description follows with reference being made to the accompanying single figure of drawing which forms part of the specification and comprises a top plan view of the variable orifice diverter valve according to the invention, with some parts shown in cross section.

DESCRIPTION OF THE PREFERRED EMBODIMENT

As illustrated in the single figure of drawing, the variable orifice diverter valve according to the invention, indicated by the reference numeral 10, includes an elongated body assembly 12. Body assembly 12 may be made of a material suitable to hot gas valve applications, such for example, as stainless steel, inconel or carbon.

Mounted in body assembly 12, at a first end 14 as seen in the drawing, is a gas inlet member 16 having an orifice therein and gas outlet means comprising a pair of restrictors 18 and 20. Restrictors 18 and 20 are positioned in opposing relation with respect to a passageway 26 that extends from the first end 14 of body assembly 12 to a second end 22. Attached to the body assembly 12 at the second end 22 thereof is an electrical torque motor 24. Included in the body assembly 12 in the passageway 26 therein is an elongated member or armature 28. Armature 28 preferably is made of a magnetic material that is suitable for hot gas applications, one such material being Permendur.

A first end 30 of armature 28 is suitably attached by a ball screw attachment member 32 to the output or drive shaft 34 of motor 24. Motor 24 may be energized by means not shown for rotation in one direction or the other. Shaft 34 is positioned in alignment with passageway 26. O-ring seals 36 provided around ball screw member 32 serves to seal the passageway 26 at the second end 22 of the body assembly 12, adjacent the motor 24. The other or second end 38 of armature 28, which end is tapered as shown, extends into the opening or orifice 40 of the orifice member 16, with a portion 42 of the armature 28 adjacent the tapered end 38 being positioned between the restrictors 18 and 20, in close spatial relation thereto. By close spatial relation is meant a distance of about four or five thousandths of an inch, this being the total distance through which the portion 42 of the armature 28 is movable to open the seal at one of the restrictors 18 or 20 and then to close the seal at the other restrictor.

Such deflection of the armature 28 out of sealing contact with one of the restrictors 18 or 20 and into sealing contact with the other restrictor is enabled by means of a flexure 44 provided on the ball screw member 32.

A coil assembly 46 mounted on the body assembly 12 in cooperative relation with the armature 28 and in sealing relation with respect to passageway 26 is provided for selectively deflecting, that is, pulling the armature 28 toward one side or the other of the body assembly 12, and thereby toward one or the other of the restrictors 18 or 20, sealing that one of the restrictors against which it is pulled.

More specifically, as shown in the drawing, the coil assembly 46 includes a first U-shaped member 48 having a cross bar 49 to which legs 50 and 52 are attached by suitable screw means. Legs 50 and 52 extend through respectively associated cutouts or openings 54 and 56 in the wall of the body assembly 12, on the side thereof on which restrictor 18 is positioned. A coil 58 is wound on leg 50. Similarly, a coil 60 is wound on leg 52.

The coil assembly 46 includes, in addition, a second U-shaped member 62 having a cross bar 61 to which legs 64 and 66 are attached by suitable screw means. Legs 64 and 66 extend through respectively associated cutouts or openings 68 and 70 in the wall of the body assembly 12 on the side thereof in which restrictor 20 is positioned. A coil 72 is wound on leg 64. Similarly, a coil 74 is wound on leg 66.

The U-shaped members 48 and 62 may be made of a non-magnetic material, such as an appropriate plastic or composite material suitable for the application. The pulling action on the armature 28 is caused by the electromagnetic field set up by the selective energization of the coil pairs 58, 60 and 72, 74. That is to say, energization of the coils 58 and 60 causes the armature portion 42 to move against the restrictor 18 for sealing the latter, and energization of the coils 72 and 74 causes the armature portion 42 to move against the restrictor 20.

This mechanical and electrical arrangement enables the selective diversion of gas entering the orifice 40 of the orifice member 16 through one or the other of the restrictors 18 and 20. There is thus provided a capability of diverting the flow of gas from one nozzle (not shown) to another nozzle (not shown), for example, to provide roll control or steering of a projectile.

As shown in the drawing, the aforementioned portion 42 of the armature 28 includes a pressure balance system 76 for compensating for the differences in pressure on the opposite sides of the armature 28 that exist when the armature portion 42 is in contact with one of the restrictors 18 or 20, thus enabling the deflection of the armature 28 by means of smaller pulling forces thereon by the coil assembly 46. The pressure balance system 76 includes a piston 78 that is positioned in a hole having a cylindrical wall 80 in the second end 38 of the armature 28. The piston 78 is held fixed in a centrally aligned position between restrictors 18 and 20 by piston stops 82 and 84. Piston stops 82 and 84, in turn, are fixed in position in respectively associated connecting means 83 and 85 provided for connecting the restrictors 18 and 20 to utilization means such, for example, as a control nozzle. A pin 86 attached to stop 82 contacts one end of piston 78. Similarly, a pin 88 attached to stop 80 contacts the other end of piston 78. The length of piston 78 is slightly less than the thickness of the portion 42 of the armature 28. Since the piston 78 is centrally positioned with respect to the restrictors 18 and 20, it does not, at anytime, contact either of the restrictors. Upon deflection of armature 28, the piston 78 slides in the cylindrical opening 80 in the armature portion 42, thereby allowing the portion 42, to move and effectively to seal the restrictor 18 or 20 against which it is moved.

As those skilled in the art will understand, the pressure balance 76 may be dispensed with, if desired. Significantly greater electromagnetic pulling forces would then be required, however, from the coil assembly 46 for effecting the selective sealing of the restrictors 18 and 20 by deflection of the armature 28.

The torque motor 24 and the ball screw member 32 are used to move the armature 28 fore and aft, that is, endwise. The end 38 of armature 28 which is tapered is utilized as a pintle so that the fore and aft movement of the armature 28 controls the size of the opening or orifice 40 in member 16.

Thus, according to the invention, there is accomplished in a single valve two separate functions that, in the prior art, has required two separate valves.

It is believed that this invention brings solid propellant control systems a step closer to competing with liquid control systems. Liquid propellant control systems have enjoyed an advantage in respect of the ease with which they have been able to be shut down, and not consume propellant, when control is not required. Solid propellant control systems, on the other hand, have had to continue burning at the required thrust control level regardless of control demands once they have been ignited. This invention will allow a solid propellant system to burn at a much lower thrust level by increasing the orifice size, therefore significantly reducing the amount of solid propellant consumed during times of low level demand on the control system.

This invention also significantly decreases the complexity of designing and fabricating a variable thrust level control system. The multiple thrust level solid propellant divert systems of the prior art have had to employ multiple solid propellant pulses or complex grain configurations to provide multiple thrust level capability. With the present invention, the thrust level may be controlled simply by changing the orifice size.

In addition, this invention may enable solid propellant control systems to become much more weight competitive with liquid control systems in applications including projectile guidance, advanced ejection seats, and Strategic Defense Initiative related divert systems.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the scope of the appended claims.

What is claimed is:

1. A variable orifice diverter valve comprising:
an elongated body assembly having a first end and a second end with a passageway extending therethrough from said first end to said second end,
a fluid inlet member having an orifice therein positioned at said first end of said body assembly in alignment with said passageway therein,
a pair of restrictors positioned in opposing relation with respect to said passageway at the first end of said body assembly, each of said restrictors having a connecting means associated therewith for the connection thereof to an individually associated outlet,
a torque motor positioned at the second end of said body assembly, said motor having a reversible drive shaft positioned in alignment with said passageway in said body assembly,
an elongated magnetic member positioned in the passageway in said body assembly, said magnetic member having a first end and a second end,
ball screw means including flexure means coupling the first end of said magnetic member to said drive shaft of said torque motor whereby operation of said motor causes fore and aft movement of said magnetic member,
the second end of said magnetic member being positioned between said restrictors in close spatial relation thereto, and
a coil assembly positioned on said body assembly in cooperative relation with said magnetic member and operative when energized to produce an electromagnetic field that pulls said magnetic member toward one or the other of said restrictors, sealing the restrictor it is pulled against and diverting the fluid flow entering the orifice of said inlet member through the other restrictor,
the second end of said magnetic member having a portion that is tapered and positioned in cooperative relation with the orifice in said fluid inlet member whereby fore and aft movement of said magnetic member controls the size of said orifice and the amount of fluid flow therethrough.

2. A variable orifice diverter valve as defined in claim 1,
wherein said magnetic member at the portion thereof positioned between said restrictors includes a hole having a cylindrical wall that is centrally aligned with respect to said restrictors, and
further including a piston in said hole, and
a separate piston stop means associated with each of said connecting means associated with said restrictors for holding said piston fixedly in position between said restrictors,
whereby upon energization of said coil assembly and resultant pulling of said magnetic member toward one or the other of said restrictors there is sliding movement of said piston and the cylindrical wall of said hole,
thereby providing compensation for the pressure difference that exists on the opposite sides of said armature with the magnetic member in sealing contact with one of said restrictors and enabling said magnetic member to be pulled out of sealing contact with said one restrictor and into sealing contact with the other one of said restrictors with a smaller electromagnetic force.

* * * * *